United States Patent
Ohtomo et al.

(10) Patent No.: US 9,829,315 B2
(45) Date of Patent: Nov. 28, 2017

(54) OMNIDIRECTIONAL IMAGE MEASURING INSTRUMENT

(75) Inventors: Fumio Ohtomo, Tokyo-to (JP); Hitoshi Otani, Tokyo-to (JP); Tadayuki Ito, Tokyo-to (JP); Kazuki Osaragi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 832 days.

(21) Appl. No.: 13/348,740

(22) Filed: Jan. 12, 2012

(65) Prior Publication Data

US 2012/0212588 A1    Aug. 23, 2012

(30) Foreign Application Priority Data

Feb. 21, 2011  (JP) .................. 2011-034948

(51) Int. Cl.
*H04N 13/02* (2006.01)
*G06K 9/00* (2006.01)
(Continued)

(52) U.S. Cl.
CPC ............. *G01C 15/002* (2013.01); *G01C 1/04* (2013.01); *G01C 11/02* (2013.01)

(58) Field of Classification Search
CPC ........... H04N 7/12; H04N 11/02; H04N 11/04
(Continued)

(56) References Cited

U.S. PATENT DOCUMENTS 4,026,631 A * 5/1977 Erb .................... G02B 27/2235
                                                    33/20.4
5,166,878 A    11/1992 Poelstra
(Continued)

FOREIGN PATENT DOCUMENTS

EP    1024342 A1    8/2000
EP    1219925 A2    7/2002
(Continued)

OTHER PUBLICATIONS

Extended European Search Report completed Jun. 12, 2013 in corresponding European patent application No. EP 12000564.
(Continued)

*Primary Examiner* — Jay Patel
*Assistant Examiner* — Salame Amr
(74) *Attorney, Agent, or Firm* — Nields, Lemack & Frame, LLC (57) ABSTRACT

An omnidirectional image measuring instrument includes a horizontal rotary table, a horizontal rotary driving unit capable of rotating the horizontal rotary table, an electronic distance meter (EDM) device and an image pickup device provided on the horizontal rotary table, and a control device for synchronously controlling a distance measurement by the EDM device and an image pickup by the image pickup device. The control device rotates the horizontal rotary table at every predetermined angle, operates the image pickup device, acquires single images at every predetermined rotational angle over a total circumference, combines the single images, prepares an omnidirectional image, performs scanning with a distance measuring light from the EDM device, carries out the distance measurement at every predetermined rotational angle over the total circumference, calculates a horizontal angle and a vertical angle of a distance measuring point from the omnidirectional image and obtains three-dimensional data of the measuring point.

5 Claims, 6 Drawing Sheets

(51) Int. Cl.
*G01C 15/00* (2006.01)
*G01C 1/04* (2006.01)
*G01C 11/02* (2006.01)

(58) Field of Classification Search
USPC .............................. 348/50; 382/181; 702/159
See application file for complete search history.

(56) References Cited

U.S. PATENT DOCUMENTS

| | | | | |
|---|---|---|---|---|
| 5,748,865 | A * | 5/1998 | Yamamoto | G01B 11/24 345/423 |
| 6,168,009 | B1 * | 1/2001 | Asai | H05K 13/0413 198/468.2 |
| 6,754,370 | B1 * | 6/2004 | Hall-Holt et al. | 382/106 |
| 7,552,025 | B2 | 6/2009 | Ohtomo et al. | |
| 2001/0055422 | A1 * | 12/2001 | Roustaei | 382/181 |
| 2004/0076340 | A1 | 4/2004 | Nielsen | |
| 2005/0029458 | A1 * | 2/2005 | Geng | G08B 13/19608 250/347 |
| 2005/0062949 | A1 * | 3/2005 | Irie | G03F 7/70066 355/53 |
| 2005/0162999 | A1 * | 7/2005 | Yamashita | G11B 7/08511 369/44.34 |
| 2007/0047940 | A1 * | 3/2007 | Matsumoto | G01C 15/004 396/106 |
| 2007/0081695 | A1 | 4/2007 | Foxlin et al. | |
| 2008/0215231 | A1 * | 9/2008 | Breed | G08G 1/161 701/117 |
| 2009/0138233 | A1 | 5/2009 | Kludas et al. | |
| 2009/0153985 | A1 * | 6/2009 | Nagaoka | G02B 7/021 359/733 |
| 2009/0254294 | A1 * | 10/2009 | Dutta | G01C 17/28 702/92 |
| 2010/0030515 | A1 * | 2/2010 | Kludas | G01C 15/002 702/159 |
| 2010/0085442 | A1 * | 4/2010 | Yamashita | H04N 5/232 348/222.1 |
| 2010/0245848 | A1 * | 9/2010 | Sakamoto | G03F 9/7088 356/620 |
| 2012/0092149 | A1 | 4/2012 | Fujisawa | |

FOREIGN PATENT DOCUMENTS

| | | |
|---|---|---|
| EP | 1493990 A1 | 1/2005 |
| EP | 1903304 A2 | 3/2008 |
| JP | 9-257481 A | 10/1997 |
| JP | 2001-41747 A | 2/2001 |
| JP | 2001-317915 A | 11/2001 |
| JP | 2003-329453 A | 11/2003 |
| JP | 2004-163292 A | 6/2004 |
| JP | 2007-71835 A | 3/2007 |
| JP | 2007-171048 A | 7/2007 |
| JP | 2009-508122 A | 2/2009 |
| JP | 2010-266259 A | 11/2010 |
| WO | 00/25089 A1 | 5/2000 |

OTHER PUBLICATIONS

Japanese communication dated Jan. 6, 2015 in corresponding Japanese patent application No. JP 2011-034948.
Japanese communication dated Sep. 30, 2014 in corresponding Japanese patent application No. JP 2011-034948.

* cited by examiner

DIFFERENCE PROCESSING

IMAGE ADDRESS (X,Y)
→ OMNIDIRECTIONAL IMAGE (H, V)

FIG. 6

OMNIDIRECTIONAL IMAGE MEASURING INSTRUMENT

BACKGROUND OF THE INVENTION

The present invention relates to an omnidirectional image measuring instrument for preparing a 360 degree omnidirectional image and for measuring three-dimensional data of an object to be measured placed on a total circumference.

As an image pickup instrument for taking an omnidirectional image, there has been conventionally an omnidirectional camera. The omnidirectional camera is a system into which six or more cameras or image pickup units are integrated so as to enable the image pickup of a total circumference. Further, as an instrument for taking an omnidirectional image and also for measuring the three-dimensional data of an object to be measured present on the total circumference, there is a total station provided with an image pickup device.

Since the omnidirectional camera has a configuration that the six or more cameras or image pickup units are integrated, an instrument configuration is complicated, the synchronization control over each camera is required to capture images taken by the respective cameras or to combine the images with each other, thereby increasing a price of the camera.

Furthermore, the total station can acquire the omnidirectional image or the three-dimensional data with high accuracy, but the total station is very expensive.

SUMMARY OF THE INVENTION

It is an object of the present invention to provide an omnidirectional image measuring instrument which can prepare an omnidirectional image with a simple instrument configuration and can measure the three-dimensional data of an object to be measured placed on a total circumference.

An omnidirectional image measuring instrument according to the present invention comprises a horizontal rotary table which is horizontally supported by a support portion and provided to be rotatable in the horizontal direction, a horizontal rotary driving unit capable of rotating the horizontal rotary table at a constant speed, an EDM device and an image pickup device provided on the horizontal rotary table, and a control device for synchronously controlling a distance measurement by the EDM device and an image pickup by the image pickup device, and in the omnidirectional image measuring instrument, the control device controls the horizontal rotary driving unit, rotates the horizontal rotary table at every predetermined angle, operates the image pickup device, acquires single images at every predetermined rotational angle over a total circumference, combines the single images, prepares an omnidirectional image, rotates the horizontal rotary table, performs scanning with a distance measuring light from the EDM device, carries out the distance measurement at every predetermined rotational angle, carries out the distance measurement over the total circumference, calculates a horizontal angle and a vertical angle of a distance measuring point from the omnidirectional image and obtains three-dimensional data of the measuring point.

Further, in the omnidirectional image measuring instrument according to the present invention, the EDM device and the image pickup device are provided on the horizontal rotary table via a tilt table, the tilt table is tiltable at a predetermined angle in the elevation direction, and the control device rotates the horizontal rotary table at every predetermined rotational angle in states that the EDM device and the image pickup device are horizontal or tilted, carries out the acquisition of the single image by using the image pickup device and the distance measurement by using the EDM device, prepares the omnidirectional image, calculates a horizontal angle and a vertical angle of the measuring point from the omnidirectional image, and obtains the three-dimensional data of the measuring point.

Further, in the omnidirectional image measuring instrument according to the present invention, the control device specifies a vertical plane or a horizontal plane including the measuring point from the three-dimensional data of at least two measuring points.

Further, in the omnidirectional image measuring instrument according to the present invention, the control device specifies a plane including the measuring points from three-dimensional data of at least three measuring points obtained in states that the EDM device and the image pickup device are horizontal or tilted.

Furthermore, in the omnidirectional image measuring instrument according to the present invention, the horizontal rotary table is configured to rotate at 90° with respect to a horizon.

According to the present invention, the omnidirectional image measuring instrument comprises a horizontal rotary table which is horizontally supported by a support portion and provided to be rotatable in the horizontal direction, a horizontal rotary driving unit capable of rotating the horizontal rotary table at a constant speed, an EDM device and an image pickup device provided on the horizontal rotary table, and a control device for synchronously controlling a distance measurement by the EDM device and an image pickup by the image pickup device, and in the omnidirectional image measuring instrument, the control device controls the horizontal rotary driving unit, rotates the horizontal rotary table at every predetermined angle, operates the image pickup device, acquires single images at every predetermined rotational angle over a total circumference, combines the single images, prepares an omnidirectional image, rotates the horizontal rotary table, performs scanning with a distance measuring light from the EDM device, carries out the distance measurement at every predetermined rotational angle, carries out the distance measurement over the total circumference, calculates a horizontal angle and a vertical angle of a distance measuring point from the omnidirectional image and obtains three-dimensional data of the measuring point. As a result, the three-dimensional data of the measuring point can be acquired without an angle detector for detecting a vertical angle and a horizontal angle and hence an inexpensive simple and configuration can be provided.

Furthermore, according to the present invention, in the omnidirectional image measuring instrument, the EDM device and the image pickup device are provided on the horizontal rotary table via a tilt table, the tilt table is tiltable at a predetermined angle in the elevation direction, and the control device rotates the horizontal rotary table at every predetermined rotational angle in states that the EDM device and the image pickup device are horizontal or tilted, carries out the acquisition of the single image by using the image pickup device and the distance measurement by using the EDM device, prepares the omnidirectional image, calculates a horizontal angle and a vertical angle of the measuring point from the omnidirectional image, and obtains the three-dimensional data of the measuring point. As a result, the three-dimensional data required to specify a plane can be easily obtained with a simple configuration.

DETAILED DESCRIPTION OF THE PREFERRED EMBODIMENTS

Description will be given on an embodiment of the present invention by referring to the attached drawings.

Figure 1:
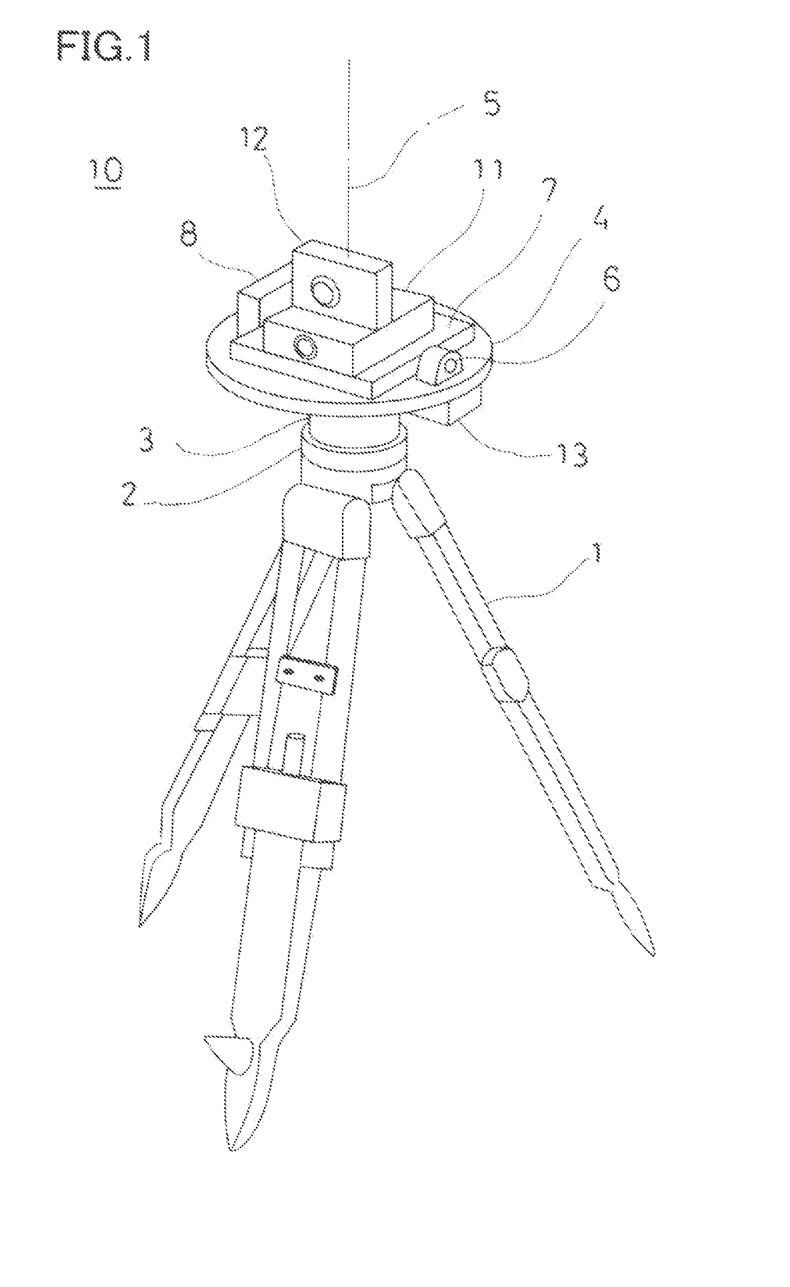
FIG. 1 is an overall perspective view of an omnidirectional image measuring instrument to which the present invention is applied.

FIG. 1 shows an outline of an omnidirectional image measuring instrument 10 to which the present invention is applied, reference numeral 1 in the drawing represents a tripod as a support portion, a leveling unit 2 is provided at an upper end of the tripod 1, and a horizontal rotary table 4 is provided on the leveling unit 2 via a horizontal rotary driving unit 3. The horizontal rotary table 4 can rotate in total circumference around a central axis of horizontal rotation 5 extending in a vertical direction.

The horizontal rotary driving unit 3 comprises a horizontal rotary motor (not shown) as a driving source and, for example, a stepping motor or a servo motor whose rotational amount is controllable is used as the horizontal rotary motor and the horizontal rotary motor enables the continuous rotation and also enables intermittent driving since the motor rotates in units of a predetermined angle.

A tilt table 7 is provided on the horizontal rotary table 4 via a tilt shaft 6 in a tiltable manner. A tilt driving unit 8 is coupled with the tilt shaft 6, the tilt driving unit 8 is provided with a tilt motor (not shown) as a driving source, and the tilt driving unit 8 can rotate the tilt table 7 at a fixed angle V in an elevation direction with respect to the horizon. It is to be noted that, as to the rotation at the fixed angle by the tilt driving unit 8, the rotational amount of the motor may be electrically controlled, or the rotation may be mechanically restricted by stoppers, in such a manner that the stoppers come into contact with the tilt table 7 respectively at a position where the tilt table 7 is horizontal and a position where the tilt table 7 is tilted at the fixed angle.

An EDM (Electronic Distance Meter) device 11 and an image pickup device 12 are provided on the tilt table 7.

The EDM device 11 is an electro-optical distance meter, which is of a non-prism type, and a commercially available small handheld electro-optical distance meter can be used, for example. As the image pickup device 12, either a steel camera for taking images one by one or a video camera for taking continuous images can be adopted, and a camera for acquiring digital images can suffice.

The image pickup device 12 may be provided in such a manner that the image pickup device 12 piles on the EDM device 11, or the EDM device 11 and the image pickup device 12 may be provided in parallel on the tilt table 7. In any case, an optical axis of the EDM device 11 is parallel to an optical axis of the image pickup device 12, and a relationship between these optical axes is known.

A control device 13 is provided to the horizontal rotary table 4, and the Control device 13 is electrically connected to the leveling unit 2, the horizontal rotary driving unit 3, the tilt driving unit 8, the EDM device 11, and the image pickup device 12 and controls drivings and operations of these units and devices.

Figure 2:
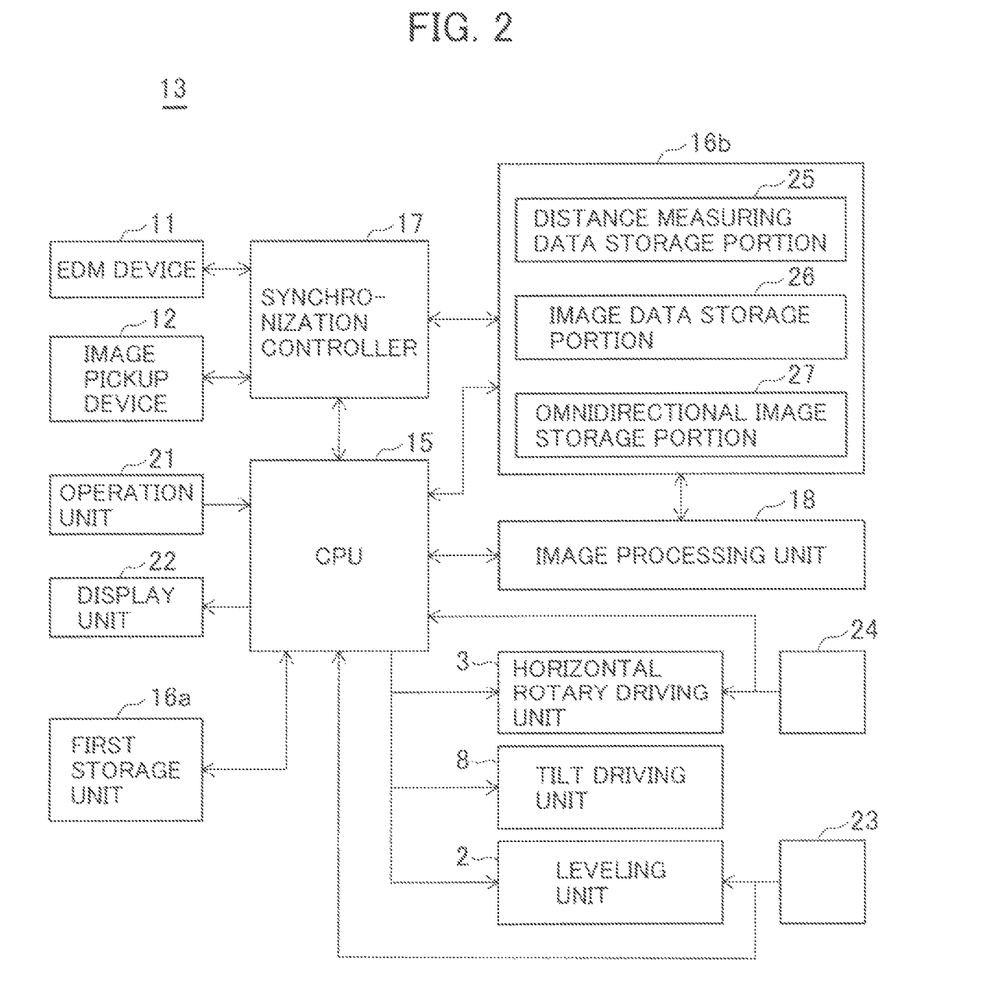
FIG. 2 is a schematic block diagram of a control device of the omnidirectional image measuring instrument.

FIG. 2 is a block diagram of the control device 13. The control device 13 mainly comprises a control arithmetic unit (CPU) 15, a storage unit 16, a synchronization controller 17, and an image processing unit 18, and the storage unit 16 has further a first storage unit 16a for storing programs and a second storage unit 16b for storing image data and distance measuring data. It is to be noted that the first storage unit 16a and the second storage unit 16b may be individual memories or one memory may be divided into a program storage unit and a data storage unit.

The EDM device 11 and the image pickup device 12 are connected to the synchronization controller 17, and the EDM device 11 and the image pickup device 12 are connected to the control arithmetic unit 15 via the synchronization controller 17. An operation unit 21 and a display unit 22 are connected to the control arithmetic unit 15 and the leveling unit 2, the horizontal rotary driving unit 3, and the tilt driving unit 8 are also connected to the control arithmetic unit 15.

The leveling unit 2 has a tilting sensor 23 provided to the horizontal rotary table 4, and a detection result from the tilting sensor 23 is input to the leveling unit 2. A reference position detecting sensor 24 for detecting a reference position in regard to the rotation of the horizontal rotary table 4 is provided to the horizontal rotary driving unit 3 or the horizontal rotary table 4, thereby detecting the reference position (a rotational angle) 0° of the horizontal rotary table 4. It is to be noted that an arbitrary detecting sensor such as an optical photo-interrupter or a magnetic proximity sensor can be used as the reference position detecting sensor 24.

The synchronization controller 17 is configured to control the distance measurement carried out by the EDM device 11 and the image pickup carried out by the image pickup device 12 and to enable associating of a measuring point with a taken image (i.e., specifying a position of a measuring point in an image).

The first storage unit 16a stores the programs such as a control program for driving and controlling the EDM device 11, the image pickup device 12, the leveling unit 2, the horizontal rotary driving unit 3, and the tilt driving unit 8, an image processing program for performing necessary image processing with respect to the image data obtained by the image pickup device 12, and a three-dimensional data arithmetic program for measuring the three-dimensional data based on the image data.

The second storage unit 16b has a distance measuring data storage portion 25 for storing the distance measuring data obtained by the EDM device 11, an image data storage portion 26 for storing the image data taken by the image pickup device 12, and an omnidirectional image storage portion 27 for storing the combined image data obtained by processing the image data.

By using the image processing program, the image processing unit 18 combines the image data, prepares a 360 degree omnidirectional image and stores the prepared omnidirectional image in the omnidirectional image storage portion 27. Furthermore, to specify the measuring point in the image, the image processing unit 18 compares an image which is in a distance measuring state with an image which is not in the distance measuring state, thereby extracting the measuring point (a point to which a distance measuring light is projected) and associates the measuring point with the image.

Figure 3:
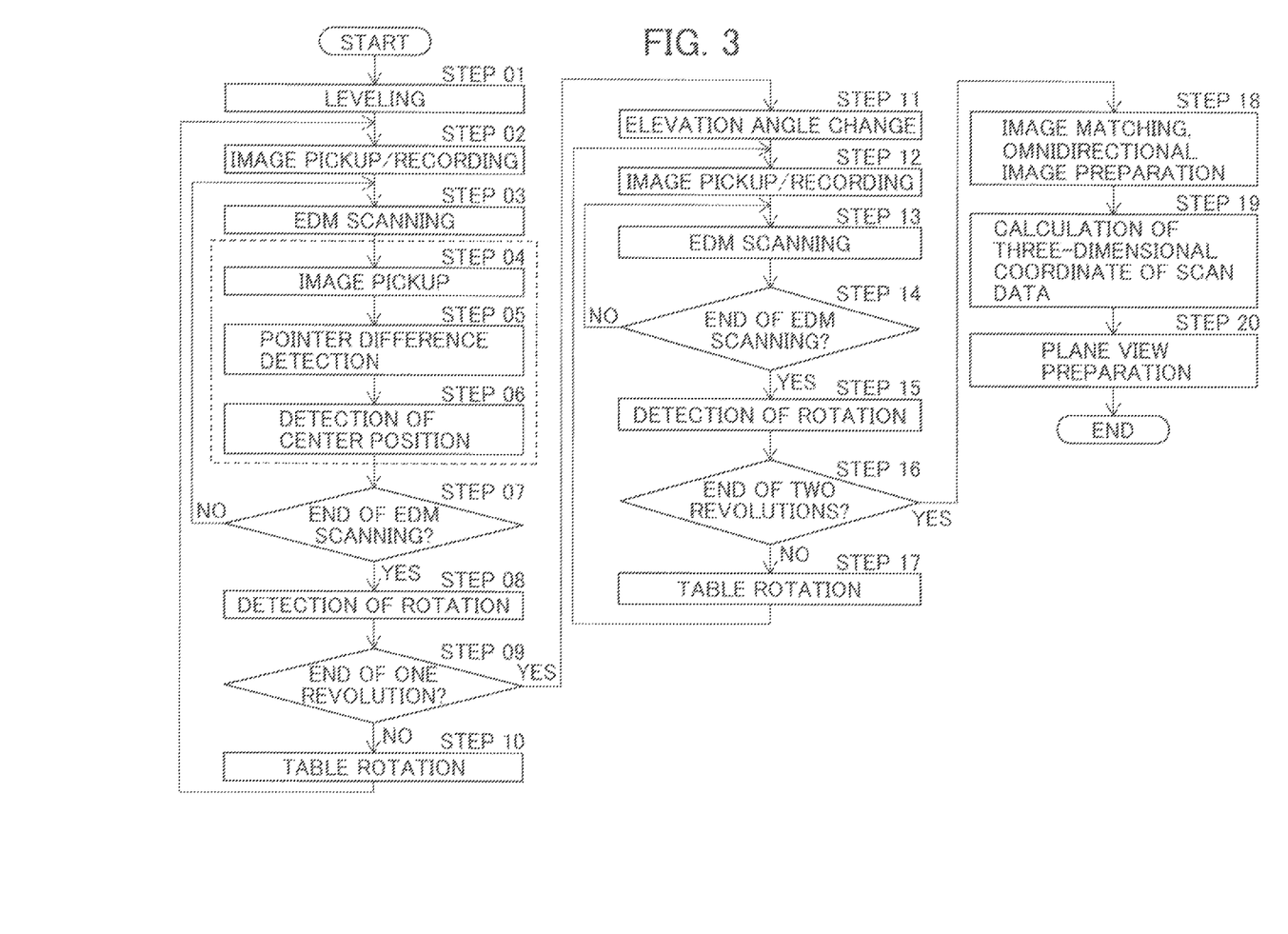
FIG. 3 is a flow chart showing an operation of the omnidirectional image measuring instrument.

A measuring operation according to the present embodiment will now be described with reference to FIG. 3, FIG. 4(A), and FIG. 4(B). It is to be noted that the measurement shown in FIG. 3 corresponds to a situation that the omnidirectional image measuring instrument 10 is installed in a room and the measurement concerning the inside of the room is carried out.

The omnidirectional image measuring instrument 10 is installed at an arbitrary position in the room and omnidirectional measurement is started.

First, the leveling is started and the horizontal rotary table 4 is horizontally set. It is to be noted that the leveling of the horizontal rotary table 4 may be manually performed instead of being performed automatically (STEP 01).

When the leveling is completed, a position at which the leveling is completed is determined as a first position, and the image pickup device 12 acquires a first image (STEP 02). The acquired first image is stored in the image data storage portion 26.

When the image is acquired, the distance measurement is carried out by the EDM device 11 within a range where the first image is taken (STEP 03). In addition, it is preferable to start the distance measurement in a state that the reference position detecting sensor 24 detects 0°. It is to be noted that the image acquisition is not carried out by the image pickup device 12 in a state that the distance measurement is carried out by the EDM device 11.

The distance measurement in the range regarding the first image of the EDM device 11 is carried out by synchronizing the distance measurement by the EDM device 11 at predetermined time intervals with the constant-speed rotation of the horizontal rotary table 4 by the horizontal rotary driving unit 3. In regard to a measurement range, the horizontal rotary table 4 is rotated at a predetermined angle, and the distance measuring light is scanned one image from a right end to a left end in the horizontal direction. That is, the distance measurement is carried out for a field angle of one image in the horizontal direction at predetermined pitch intervals. Furthermore, the optical axis of the EDM device 11 is parallel to the optical axis of the image pickup device 12, and a scan position of the distance measuring light by the EDM device 11 deviates in up-and-down direction from the center of the image of the image pickup device 12 for a distance between two optical axes. In the drawing, the scan position deviates toward the lower side from the center of the image for the distance between the optical axes. The distance measuring data is associated with the first image data and is stored in the distance measuring data storage portion 25.

Figure 4A:
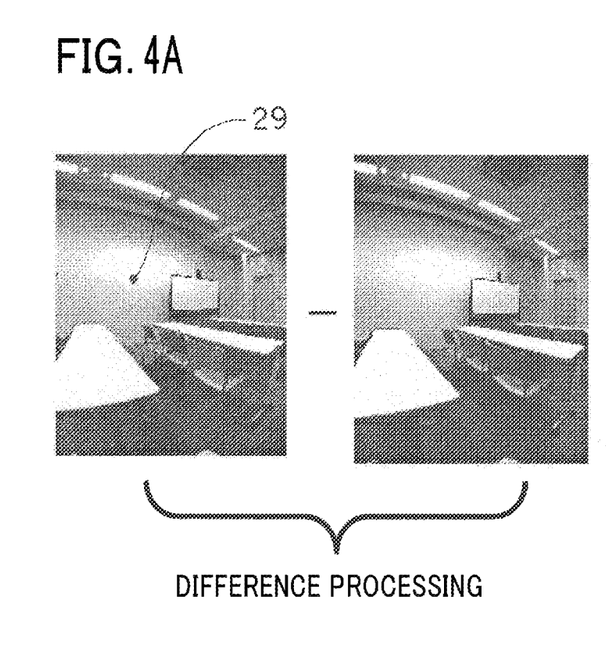
FIG. 4(A) and FIG. 4(B) are explanatory views when detecting a measuring point from an image.
Figure 4B:
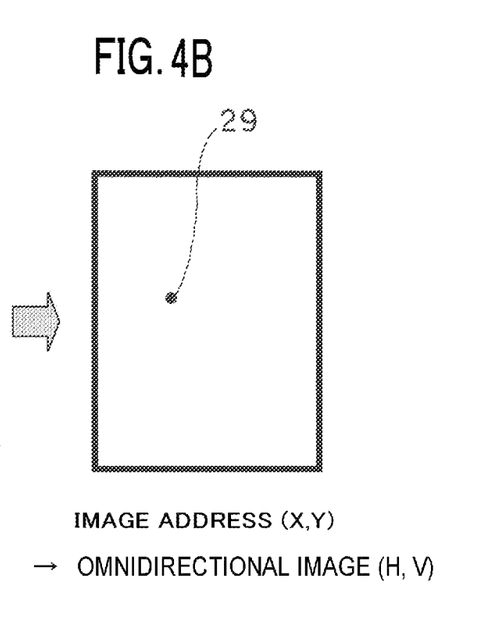

Then, in regard to an image taken first after the start of the measurement, a step of specifying a relationship between the image and the measuring point is executed (STEP 04 to STEP 06, see FIG. 4(A) and FIG. 4(B)).

At this step, in a state that the distance measuring light is projected or a state that a point light 29 as the visible light is emitted from the EDM device 11, a still image is acquired by the image pickup device 12 (FIG. 4(A)), secondly, the point light is put out, a still image is acquired, and a background image is erased by obtaining a difference between the image to which the point light 29 is projected and the image after putting the light out, thereby extracting the point light 29 (STEP 05).

When the point light 29 is extracted, a center position of the point light 29 is detected based on an arithmetic operation. This center position is a position to project the point light (the distance measuring light), and it is possible to specify the relationship between the image and the measuring point by detecting the center position (STEP 06). The specified result is stored in the distance measuring data storage portion 25 or the image data storage portion 26.

When the horizontal rotary table 4 rotates at the predetermined angle, the scanning for one image performed by the EDM device 11 is completed (STEP 07). The predetermined angle rotation of the horizontal rotary table 4 may be previously set so as to intermittently drive the horizontal rotary driving unit 3 at every predetermined rotational angle. Or sensors may be provided at equal angles so as to detect the rotation of the horizontal rotary table 4 at the predetermined angle. Or one sensor may be provided on a fixed side and a sensor operation piece (the operation piece is an optical path blocking piece when the sensor is a photosensor) for operating the sensor at equal angles may be provided on the horizontal rotary table 4 side, thereby detecting the rotation by equal angle of the horizontal rotary table 4 (STEP 08).

It is to be noted that a predetermined rotational angle of the horizontal rotary table 4 corresponds to a value obtained by dividing one revolution (360°) by an integer n, and the rotational angle is an angle which is smaller than a field angle of the image pick up device 12 in the horizontal direction and enables acquiring of a predetermined amount of overlap (an amount enabling acquiring of an overlapping amount required for combining of the image as described later).

When the EDM device 11 completes the scanning for one image, namely, when the horizontal rotary table 4 rotates at the predetermined angle, it is confirmed whether the reference position detecting sensor 24 has detected one revolution of the horizontal rotary table 4 (STEP 09). When the horizontal rotary table 4 does not rotate one revolution yet, the horizontal rotary table 4 is further rotated at the predetermined angle (STEP 10) and is stopped at a second position. A second image is taken by the image pickup device 12 at the second position (STEP 02). Then, in the range corresponding to the second image, the scanning in the horizontal direction is performed by the EDM device 11 and the distance measuring data is obtained. The second image is associated with the distance measuring data concerning the second image respectively, and the second image and the distance measuring data are stored in the distance measuring data storage portion 25 or the image data storage portion 26.

Furthermore, when the horizontal rotary table 4 is rotated at the predetermined angle, and the acquisition of the image and the distance measuring scanning of the acquired image are repeatedly carried out. The number of times of changing an angle position reaches n, the achievement of the 360° rotation is confirmed by the reference position detecting section 24.

When one revolution of the horizontal rotary table 4 is confirmed, the tilt driving unit 8 is driven, and the tilt table 7 is tilted at a predetermined angle (V). This tilting is maintained until the measurement is completed (STEP 11).

In a state that the tilt table 7 is tilted, the first image is acquired by the image pickup device 12 at the first position of the horizontal rotary table 4 (STEP 12), and then the horizontal rotary table 4 is rotated at the predetermined angle. The EDM device 11 is rotated at the predetermined angle in the horizontal direction in a state that the EDM device 11 is tilted via the horizontal rotary table 4, and the horizontal scanning is performed by the EDM device 11 in the range corresponding to the first image, and the distance measuring data is obtained. The image data and the distance measuring data are associated with each other and further, are stored in the distance measuring data storage portion 25 or the image data storage portion 26 together with the information that the image data and the distance measuring data are acquired in a state that the EDM device 11 and the image pickup device 12 are tilted (STEP 13).

Once the scanning by the EDM device 11 is completed (STEP 14), the horizontal rotary table 4 is rotated at a predetermined angle to be stopped at the second position, an image is acquired at the second position by the image pickup device 12, and further, the distance measurement and the scanning in regard to the second image are carried out by the EDM device 11. Moreover, the image acquisition and the distance measuring scanning are executed at the stop position with respect to each image.

Additionally, when the second total circumferential rotation (360°) of the horizontal rotary table 4 is detected by the reference position detecting sensor 24, the acquisition of the image data and the acquisition of the distance measuring data are completed (STEP 15 to STEP 17), and the image processing and further, the calculation of three-dimensional data (a three-dimensional coordinate) of the measuring point are started.

Figure 5A:
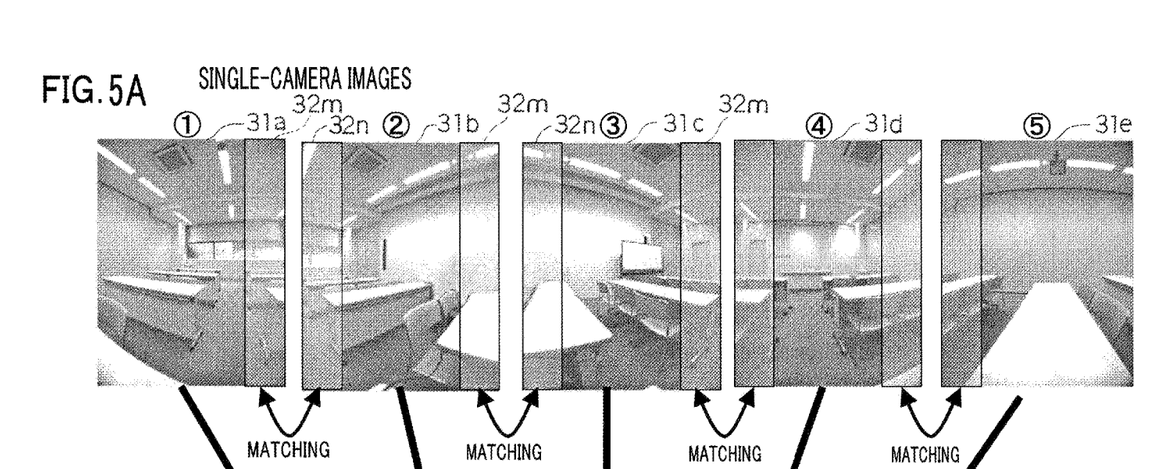
FIG. 5 is an explanatory view when single images are combined and an omnidirectional image is prepared.
Figure 5B:
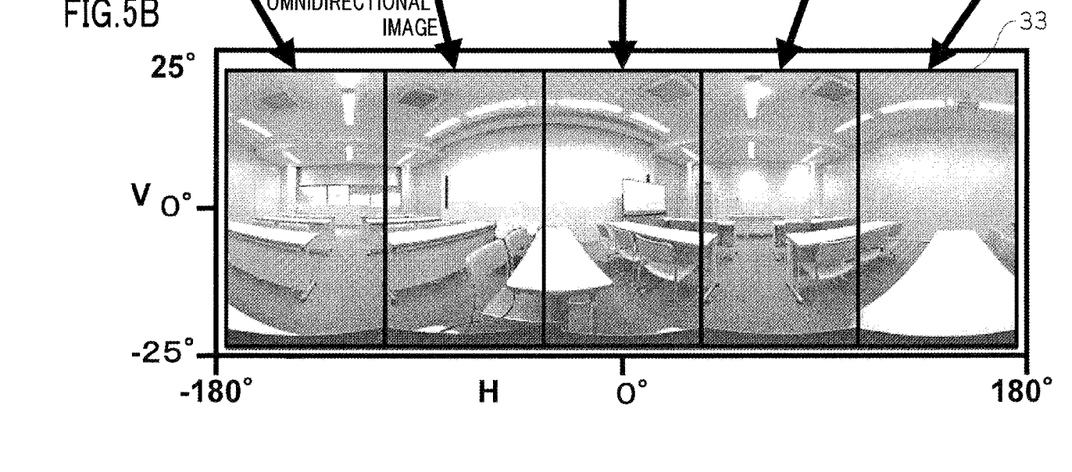

FIG. 5(A) and FIG. 5(B) show how to combine a panoramic image 33 in total circumference by using images taken at respective rotational positions of the horizontal rotary table 4. In the drawings, the horizontal rotary table 4 is set to rotate at an angle H obtained by equally dividing the total circumference by five. That is, the drawings show a case where images are acquired at five rotational positions of the horizontal rotary table 4 and further, the distance measuring scanning is performed in regard to the ranges corresponding to the respective images. It is to be noted that the same processing is performed when the tilt table 7 is tilted and hence the explanation will be omitted below.

A first image 31a to a fifth image 31e are acquired respectively at the five rotational positions of the horizontal rotary table 4, and these images are stored in the image data storage portion 26.

Further, a field angle of each acquired image 31 in the horizontal direction is larger than the horizontal rotational angle H, and images overlap the images adjacent thereto at both left and right end portions 32m and 32n when preparing the panoramic image.

When combining the images adjacent to each other, the image matching is carried out at both left and right end portions 32m and 32n which are overlapped. Incidentally, as image matching techniques, there are an SSDA method (Sequential similarity detection algorithm: a residual of density values between a template and a matching window is calculated, and a position at which the residual becomes minimum is obtained), a normalized cross correlation method (Cross correlation: a correlation value of a template and a matching window is calculated to search for a corresponding point), a least squares matching method (Least squares matching: the affine transform is used to set a shape of a matching window as an unknown parameter, and a position and the shape of the matching window with respect to a template are obtained), and others.

When the image matching is performed at both the left and right end portions 32m and 32n of each adjacent image, a combined image in which the left and right single images are continuous can be acquired, and the first image 31a to the fifth image 31e are sequentially combined by the image matching, thereby combining an omnidirectional image having a field angle of 360° (STEP 18).

Since the omnidirectional image is acquired by the image pickup device 12 and the reference position and the total circumferential rotation can be detected by the reference position detecting sensor 24, an angle of an arbitrary position in the horizontal direction (horizontal angle) can be measured from a developed panoramic image. For instance, FIG. 5(B) shows the panoramic image 33 which is acquired by combining the first image 31a to the fifth image 31e, and if it is assumed that the center of the panoramic image 33 is a horizontal angle of 0° as the reference position, a horizontal angle at each of both ends is ±180°, and if a space between both the ends is divided by 360, one division is a horizontal angle of 1°. Therefore, when the omnidirectional image is acquired, all directions in the room can be measured from the image.

Figure 6:
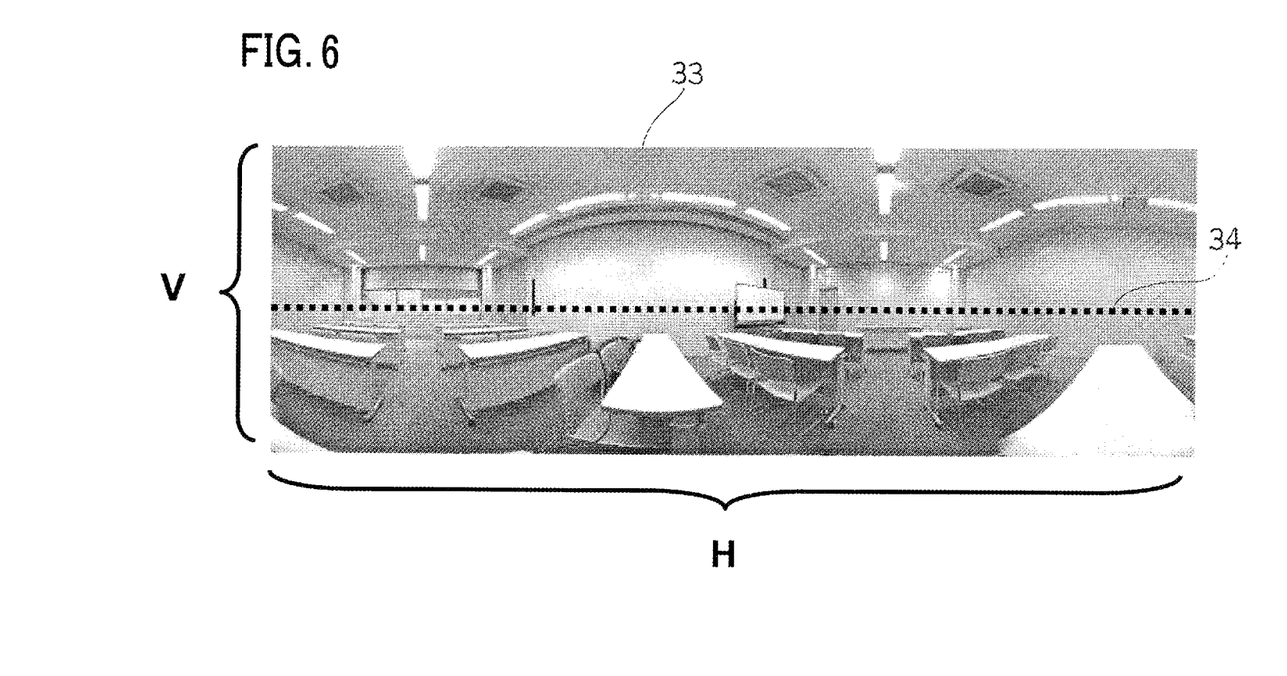
FIG. 6 is an explanatory view showing a relationship between the omnidirectional image and the measuring points.

FIG. 6 shows a relationship between the panoramic image 33 and measuring points 34.

The measuring points 34 are positioned on a horizontal plane, a locus of point appears as a horizontal line on the image. Assuming that the reference position (the horizontal angle: 0°) of the horizontal rotary table 4 is a starting point of the measuring points 34, when the distance measuring light from the EDM device 11 is projected at equal time intervals and a rotational speed of the horizontal rotary table 4 is set to a constant speed (a known rotational speed), a horizontal angle pitch between the measuring points 34 can be calculated based on each light emitting time interval of the distance measuring light and the rotational speed of the horizontal rotary table 4. The starting point of the measuring points 34 or a starting point of images may be determined based on a laser pointer extracted at the start of the measurement, or may be judged from the images in a process of combining the images.

Additionally, when the distance between the measuring points 34 is measured, a two-dimensional coordinate of the measuring point 34 can be calculated. Further, considering the fact that the inside of the room is constituted mostly of vertical planes and horizontal planes, each plane can be specified (a formula representing each plane can be calculated) when coordinates of two points within the plane are determined under conditions that the plane is vertical. A horizontal angle and an elevation angle can be obtained on the image when arbitrary position on the image is specified, and a three-dimensional coordinate of an arbitrary position in the plane can be calculated based on the elevation angle, the horizontal angle, and the formula representing the plane (STEP 19). Further, a line of intersection (a corner position) of planes adjacent to each other can be calculated based on formulas representing both the planes determined respectively.

Next, by executing the measurement of STEP 11 to STEP 17, the distance measuring data of the measuring points 34 is obtained when scanning is performed in horizontal direction at the elevation angle changed with respect to the horizontal line measured at STEP 02 to STEP 10.

Therefore, the three-dimensional coordinates of three or more different points can be obtained with respect to the plane, and the plane can be specified (an arithmetic formula representing the plane can be determined) even though the plane is tilted. Accordingly, when the tilt table 7 is tilted, the distance measuring data of the total circumference is obtained at positions having different elevation angles by tilting the EDM device 11 and further making one revolution of the EDM device 11, thereby specifying all the planes in the room. Therefore, the three-dimensional coordinate of an arbitrary point specified in the image can be acquired.

It is to be noted that the three-dimensional coordinate directly obtained by the above measurement is a polar coordinate having an origin set at the rotation center of the EDM device 11, since a horizontal angle H and a vertical angle V can be calculated from the panoramic image 33, respectively, and the transform into a Cartesian coordinate can be performed based on X=r sin V·cos H, Y=r sin V·sin H, and Z=r cos V (here, r is a distance to the measuring point), whereby a plane view of the inside of the room can be prepared based on the obtained measurement result (STEP 20).

As described above, this embodiment does not require the expensive angle detection such as an encoder configured to detect a horizontal angle, and can be easily constituted by using a commercially available electro-optical distance meter or a digital camera, thus realizing an inexpensive configuration.

It is to be noted that the EDM device 11 and the image pickup device 12 are provided to the tilt table 7 and configured to integrally tilt in the foregoing embodiment, the EDM device 11 and the image pickup device 12 may be directly installed on the horizontal rotary table 4 when an object to be measured is constituted of vertical planes and horizontal planes alone like the indoor measurement.

Moreover, the horizontal rotary table 4 may be configured to be rotatable at 90° with respect to the horizon. In this case, since the horizontal rotary table 4 rotates around a horizontal axis center and the EDM device 11 and the image pickup device 12 also rotate around the horizontal axis center. Therefore, the EDM device 11 can rotate in horizontal and vertical two directions, and the image acquisition and the distance measurement can be carried out with respect to a floor and a ceiling, thus enabling the omnidirectional image measurement in regard to the floor and the ceiling. It is to be noted that a horizontal plane can be specified in this case if three-dimensional coordinates of two measuring points in regard to each of the floor and the ceiling can be obtained.

The invention claimed is:

1. An omnidirectional image measuring instrument, comprising:
   a horizontal rotary table which is horizontally supported by a tripod installed in a room as a support portion and provided to be rotatable in the horizontal direction around a rotation center,
   a reference position detecting sensor for detecting a reference position of said horizontal rotary table,
   a horizontal rotary driving unit capable of rotating said horizontal rotary table at a constant speed,
   a commercially available handheld electronic distance meter (EDM) device and an image pickup device provided on said horizontal rotary table so that their optical axes become parallel to each other, and
   a control device for synchronously controlling a distance measurement by said EDM device and an image pickup by said image pickup device,
   wherein said control device controls said horizontal rotary driving unit, rotates said horizontal rotary table at every predetermined angle, operates said image pickup device, acquires single images at every predetermined rotational angle which enable acquisition of a predetermined overlapping amount over a total circumference, combines said single images by image matching of an overlapping portion and prepares a 360° continuous omnidirectional image with said rotation center as the center, rotates said horizontal rotary table, performs scanning with a distance measuring light from said EDM device, carries out said distance measurement at every predetermined rotational angle, carries out said distance measurement over said total circumference, prepares a horizontal line by total circumferential rotation of said distance measuring light in a horizontal direction, obtains a field angle of 360° from said omnidirectional image, sets a reference position on said omnidirectional image, calculates a horizontal angle of a measuring point based on a field angle from said reference position and calculates a vertical angle of a measuring point based on a position from said horizontal line and obtains three-dimensional data of said measuring point having an origin which is said rotation center of said horizontal rotary table.

2. The omnidirectional image measuring instrument according to claim 1, wherein said EDM device and said image pickup device are provided on said horizontal rotary table via a tilt table, said tilt table is tiltable at a predetermined angle in the elevation direction, and said control device rotates said horizontal rotary table at every predetermined rotational angle in states that said EDM device and said image pickup device are horizontal or tilted, carries out said acquisition of the single image by using said image pickup device and said distance measurement by using said EDM device, prepares the 360° omnidirectional image, calculates a horizontal angle and a vertical angle of said measuring point from said omnidirectional image, and obtains said three-dimensional data of said measuring point.

3. The omnidirectional image measuring instrument according to claim 1 or claim 2, wherein said control device specifies a vertical plane or a horizontal plane including said measuring point from said three-dimensional data of at least two measuring points.

4. The omnidirectional image measuring instrument according to claim 2, wherein said control device specifies a plane including said measuring points from three-dimensional data of at least three measuring points obtained in states that said EDM device and said image pickup device are horizontal or tilted.

5. The omnidirectional image measuring instrument according to claim 1 or claim 2, wherein said horizontal rotary table is configured to rotate at 90° with respect to a horizon.

* * * * *